(12) United States Patent
Worzyk (10) Patent No.: US 9,640,303 B2
(45) Date of Patent: May 2, 2017

(54) BUNDLE OF CABLES, A METHOD OF LAYING CABLES AND USE OF A SECURING MEANS

(71) Applicant: ABB HV CABLES (SWITZERLAND) GMBH, Baden, Aargau (CH)

(72) Inventor: Thomas Worzyk, Lyckeby (SE)

(73) Assignee: ABB HV CABLES (SWITZERLAND) GMBH, Baden, Aargau (CH)

( * ) Notice: Subject to any disclaimer, the term of this patent is extended or adjusted under 35 U.S.C. 154(b) by 0 days.

(21) Appl. No.: 15/027,416

(22) PCT Filed: Nov. 21, 2013

(86) PCT No.: PCT/EP2013/074325
§ 371 (c)(1),
(2) Date: Apr. 5, 2016

(87) PCT Pub. No.: WO2015/074696
PCT Pub. Date: May 28, 2015

(65) Prior Publication Data
US 2016/0254653 A1    Sep. 1, 2016

(51) Int. Cl.
*G02B 6/44* (2006.01)
*F16L 3/22* (2006.01)
(Continued)

(52) U.S. Cl.
CPC ............. *H01B 11/22* (2013.01); *G02B 6/506* (2013.01); *H02G 1/10* (2013.01); *H02G 9/02* (2013.01)

(58) Field of Classification Search
CPC . H02G 1/10; H02G 9/02; H01B 11/22; G02B 6/506
(Continued)

(56) References Cited

U.S. PATENT DOCUMENTS

| 4,140,114 A | 2/1979 | Moore et al. |
| 6,769,840 B1 | 8/2004 | Bernard |

(Continued)

FOREIGN PATENT DOCUMENTS

| CN | 202957067 U | 5/2013 |
| DE | 36 06 589 A1 | 9/1987 |

(Continued)

OTHER PUBLICATIONS

"Irish-Scottish Links on Energy Study (ISLES) Construction and Deployment Report", European Union European Regional Development Fund Investing in your future, Apr. 2012, XP055218877, 114 pages.

*Primary Examiner* — Robert Tavlykaev
(74) *Attorney, Agent, or Firm* — Birch, Stewart, Kolasch & Birch, LLP (57) ABSTRACT

A bundle of cables includes at least two underwater cables and a fastener for fastening the underwater cables together. The fastener is water-soluble, biologically decomposable and/or chemically decomposable. A method of laying at least two underwater cables simultaneously from a vessel and a method of using a water-soluble, biologically decomposable and/or chemically decomposable fastener to fasten at least two underwater cables together to form a bundle of cables are also described.

18 Claims, 4 Drawing Sheets

(51) Int. Cl.
*F16L 55/18* (2006.01)
*H01B 11/22* (2006.01)
*H02G 1/10* (2006.01)
*G02B 6/50* (2006.01)
*H02G 9/02* (2006.01)

(58) Field of Classification Search
USPC ..... 385/100, 101; 405/154.1, 156, 158, 173, 405/178, 184.1
See application file for complete search history.

(56) References Cited

U.S. PATENT DOCUMENTS

| | | | | |
|---|---|---|---|---|
| 8,616,805 | B2* | 12/2013 | Hawkes | ................ B63C 11/52 405/154.1 |
| 2003/0026662 | A1 | 2/2003 | Vidal et al. | |
| 2003/0113092 | A1 | 6/2003 | Porter | |
| 2009/0272780 | A1 | 11/2009 | Crawford | |
| 2011/0056702 | A1* | 3/2011 | Sharma | ................ E21B 17/026 166/378 |
| 2011/0067799 | A1 | 3/2011 | Müssig et al. | |
| 2013/0265851 | A1* | 10/2013 | Faber | ................ G01V 1/42 367/25 |
| 2014/0126865 | A1* | 5/2014 | Chang | ................ H01B 7/2825 385/101 |

FOREIGN PATENT DOCUMENTS

| | | | | |
|---|---|---|---|---|
| EP | 0 609 713 A1 | 8/1994 | | |
| EP | 0 637 618 A1 | 2/1995 | | |
| GB | 2 244 321 A | 11/1991 | | |
| GB | 2 337 366 A | 11/1999 | | |
| JP | 2008-89313 | * | 4/2008 | ............. G01D 21/00 |
| NL | WO2016/065244 A1 | * | 4/2016 | ............. E21B 41/00 |

\* cited by examiner

BUNDLE OF CABLES, A METHOD OF LAYING CABLES AND USE OF A SECURING MEANS

TECHNICAL FIELD

The present invention relates to a bundle of cables, a method of laying at least two underwater cables simultaneously from a vessel and to a use of a water-soluble, biologically decomposable and/or chemically decomposable securing means to form a bundle of underwater cables.

BACKGROUND

HVDC (High Voltage Direct Current) underwater cables and methods of laying such cables have been used since 1950's. When direct current power cables are in question, there are two cables involved. The cables may be equal or there may be one primary conductor to transmit direct current and another conductor to provide a return path. Underwater power cables and fiber optical cables are used today in an increasing amount due to the increased need of power transfer from for example offshore energy sources, including offshore renewable energy plants, such as wind power plants. Also the length for power transfer cables is increasing since there is a need to interconnect different regional electrical transmission networks to allow global trading of energy. Areas, where energy is on the other hand needed and on the other hand produced, may also be remote from each other which further increases a need for safe power transfer.

The underwater power cables may be for example HVDC or HVAC (High Voltage Alternating Current)-cables. Further common underwater cables are nowadays the above-mentioned fiber optical cables. It is known in the art to lay underwater cables and e.g. GB 2244321 A shows a method of laying such cables. It is also known in the art to lay for example two HVDC single core cables together with at least one fiber optical cable or three HVAC-cables together with at least one fiber optical cable.

As further also shown by GB 2244321 A, laying of cables can be performed from a vessel in which the cables are unwound from storage reels mounted on the vessel. The cables are laid or installed simultaneously. To be able to perform simultaneous laying or installation, the cables are secured firmly together side by side to form a cable bundle before being guided overboard into the water and then on the sea bed. The cables are often secured by means of strong adhesive tape, wires, belts or ropes, hereinafter called for securing means, which keep the cable bundle together even during burial and after burial into the sea bed.

A problem arises when one of the cables in the bundle needs to be repaired. In this case, the bundle is buried in the sea bed and the entire bundle needs to be cut in order to be able to bring the faulty cable to the surface for repair. As a consequence, the repair effort is much larger than necessary for the faulty cable. For example, in case the bundle comprises two HVDC cables and one fiber optical cable, and only the fiber optical cable is faulty, the problem is the following. To repair the fiber optical cable, the entire bundle must be cut at the sea bed, taken to the surface and spare cables need to be inserted in between the ends of the cut cables. Thus, for the repair of the fiber-optical cable, not only fiber optical cable joints need to be installed but also four power cable joints need to be installed. This is extremely costly and time consuming.

Thus, there is a need to facilitate handling of underwater cables. Especially there is a need to facilitate repairing of individual cables.

SUMMARY OF THE INVENTION

It is therefore an object of the present invention to facilitate handling and/or repairing of underwater cables after laying or installation of the cables.

It is a further object of the present invention to facilitate repairing of individual underwater cables after laying of the cables on to the sea bed. Especially, it is an object to facilitate repairing after burial of the cables into the sea bed.

It is a further object of the invention to provide an environmentally safe handling of underwater cables.

The objects of the invention have been achieved by a bundle of cables as defined in the appended claim 1, further by a method of laying at least two underwater cables simultaneously from a vessel as defined in the appended claims. The objects have also been achieved by the use of securing means which is water-soluble, biologically decomposable and/or chemically decomposable as defined in the appended claims.

According to a first aspect, the present invention relates to a bundle of cables comprising at least two underwater cables and a securing means for fastening the underwater cables together. The securing means is water-soluble, biologically decomposable and/or chemically decomposable. When the securing means dissolves or decomposes, the securing means loses its tensional strength and therefore, cables are unfastened. After a time period the securing means dissolves or decomposes completely. Thus it is possible to bring an individual cable to the surface for repair.

The bundle may comprise an underwater power cable.

The bundle may comprise an underwater fiber optical cable.

The securing means may be an adhesive tape.

Alternatively the securing means may be a strand, cord, belt or rope.

According to one embodiment the securing means may be woven.

Alternatively the securing means may be non-woven.

According to one embodiment the securing means may be wrapped around the bundle of cables.

According to one embodiment the securing means may be braided or interweaved with the cables to form a structure in which the cables are fastened together such that there is a gap between adjacent cables which corresponds to the thickness of the securing means.

Alternatively the securing means may be a clamping means.

The securing means may comprise a thermoplastic polymer.

The securing means may comprise polyglycolic acid.

The securing means may have a predetermined rate of dissolution, chemical decomposition or biological decomposition.

According to another aspect, the present invention relates to a method of laying at least two underwater cables simultaneously from a vessel. The method comprises the steps of:
 a. providing the at least two underwater cables in storage facilities;
 b. drawing or unwinding the underwater cables from the storage facilities and bringing the underwater cables together;

c. fastening the underwater cables together by means of a securing means which is water-soluble, biologically and/or chemically decomposable to form a bundle of cables as defined above;
d. guiding the bundle of cables (9; 90; 290; 390; 490; 590) overboard into the water, and
e. laying the cables on a desired position on the sea bed.

Step c) may further comprise helically wrapping the bundle of cables by means of the securing means along the length of the bundle of cables.

The wrapping may be performed such that at least two securing means are wrapped around the bundle of cables helically in opposite directions to provide a counter-helical structure for the securing means.

The method according to above may additionally comprise the step of: burying the bundle of cables into the sea bed.

According to a still further aspect, the present invention relates to a use of water-soluble, biologically decomposable and/or chemically decomposable securing means to fasten at least two underwater cables together to form a bundle of underwater cables. By using such securing means, unfastening of the cables can be provided automatically without any additional means.

Further objects and aspects will be explained more in detail below in the detailed description and with reference to the appended drawings.

DETAILED DESCRIPTION

To be able to perform a simultaneous laying of several underwater cables, the underwater cables need to be fastened or secured together before laying. In the following description, "cables" and "underwater cables" are used equally.

Figure 1:
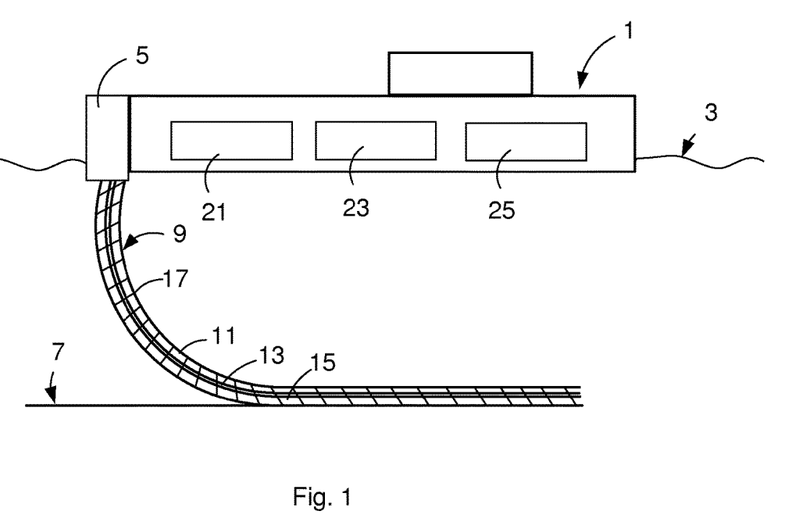
FIG. 1 shows a schematic picture of a vessel comprising a laying arrangement.

In FIG. 1 laying of underwater cables as performed in general is schematically illustrated. It has been illustrated that a vessel 1 is floating on the water 3. The vessel 1 can be a floating offshore installation, such as a ship or barge, comprising a laying arrangement 5. A bundle 9 of cables 11, 13, 15 is laid from the vessel 1 on to the sea bed 7. The distance between the surface of the water 3 and the sea bed 7 may vary from a couple of meters to hundreds of meters, for example up to about 2500 meters. It is to be understood that only a part of the length of the cables is illustrated and that the length of cables can vary and be several hundreds of meters.

The cables 11, 13, 15 can be continuously and simultaneously laid from the vessel 1. The vessel 1 comprises the laying arrangement 5 which comprises means for feeding, supporting and guiding (not shown) cables 11, 13, 15 from storage facilities 21, 23, 25 mounted on the vessel 1. The storage facilities may be for example turntables or static coils. The cables 11, 13, 15 may be individually unwound from the storage reels 21, 23, 25, fed and brought together at the laying arrangement 5 which also comprises means for applying securing means 17 to fasten the bundle 9 of cables. The laying arrangement 5 further comprises, downstream the means for applying the securing means, means for guiding the bundle of cables overboard into the water. The guiding means may be for example simply a U-shaped channel. The bundle of cables 9 is then laid on to the sea bed 7 and preferably buried into the sea bed at once or after a while. In some applications, the cables do not need to be buried, but this is rather rare.

Figure 2:
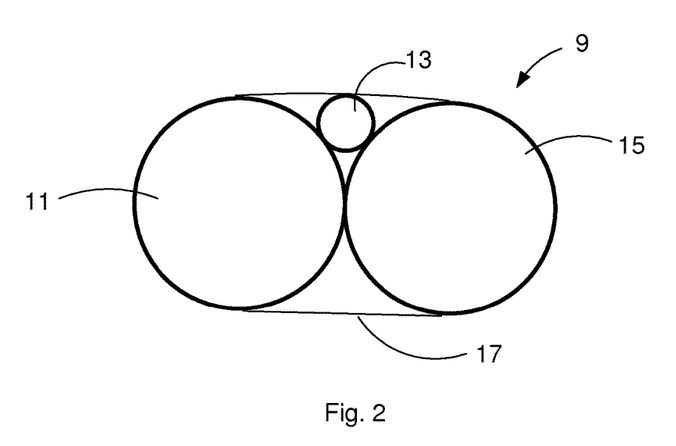
FIG. 2 illustrates a schematic diagram of a cross-section of a bundle of cables.

In FIG. 2, an example of a bundle of cables 9 in a cross section is shown. The bundle 9 of cables 11, 13, 15, can be laid with the generally defined arrangement described above. The bundle 9 comprises two HVDC power cables 11 and 15, and one optical fiber cable 13, and the securing means 17 is wrapped around the cables 11, 13 and 15. The securing means surrounds the cables 11, 13, 15 and thus fastens the cables 11, 13 and 15 together. However, the bundle of cables may contain more cables or only two cables, and the bundle illustrated in FIG. 2 is to be regarded only as an example of underwater cables that can be laid.

The underwater cables can be of various kinds, and the amount of the cables may vary. Examples of cables that can be laid are underwater power cables, such as HVDC cables, HVAC cables, medium-voltage cables and low-voltage cables, and underwater optical fiber cables. Other types of underwater cables or cable-like devices, such as flexible pipes, may also be secured and laid in a manner according to the present invention. Since fiber optical cables are needed in communications technology, it is a further advantage that such cables can be laid simultaneously with power cables.

The length of the cables may vary from hundreds of meters to many tens of kilometers and is not limited to a certain length. The diameter of an underwater power cable may be for example from 50 to 300 mm, and the diameter of an optical fiber cable may be from 20 to 60 mm. The weight of the cables may vary of from about 30 to 90 kg/m. Thus the weight of the bundle of cables may vary from about 60 to about 200 kg/m, but is not limited to such weights.

When underwater cables are laid, it is important that the cables are fastened or secured together during laying. Especially it is important that the cables are fastened together when the cables are guided overboard to the sea and laid on to the sea bed so that a simultaneous, accurate positioning of the cables can be achieved. It is a further advantage if the cables are still fastened together when the cables are buried into the sea bed. The fastening or securing of the cables is used to facilitate the conveying and handling of the cables during laying. When the cables are safely laid and/or buried into the sea bed, the securing means and a securement thus provided is no longer needed. After the burial in the sea bed, the cables are kept together due to the forces provided by the sea bed. However, the securing means used today provide securing also after the burial and as mentioned above problems arise when one of the cables in the bundle needs to be repaired.

According to the present invention the problem of facilitating handling and/or repairing of underwater cables after laying or installation of the cables is solved by providing securing means for fastening the underwater cables together to form a bundle of cables which securing means is water-soluble, biologically decomposable and/or chemically decomposable. By biological decomposition is meant that the material is broken down into constituent elements by bacterial or fungal action. By chemical decomposition is meant that the material is broken down into simpler chemical compounds by chemical action, for example by hydrolysis. By hydrolysis is meant cleavage of chemical bonds by addition of water. By water-soluble is meant that the material dissolves in water. The securing means will thus lose its tensional strength after being in contact with water when it dissolves, and/or decomposes by biological or chemical action. In this way, since the securing means releases the cables, repairing of individual underwater cables will be facilitated.

The securing means dissolves in water, or decomposes biologically or chemically after a certain time, which depends on the material used. Preferably, the material has a predetermined rate of dissolution, chemical decomposition or biological decomposition. This makes it possible to better adjust the laying process and the burial of the bundle of cables such that the cables will not be released from the bundle before burial, e.g. during laying.

The choice of the material depends on for example where in the sea bed the bundle of cables is placed. For example, if the cables are buried in the depth of hundreds of meters there is very little available oxygen in the water and thus very little bacterial action. Therefore, a securing means that decomposes biologically will not decompose or decomposes slowly. Thus, in this case a securing means that is water-soluble would be suitable. However, if the bundle of cables is buried close to the surface of the water, biological decomposing is possible. Thus a securing means which is biologically or chemically decomposable may then be chosen.

The decomposition/dissolution rate of the material used for the securing means is thus preferably predetermined. The rate can be varied and is suitably adjusted to the laying or installation process so that the material provides sufficient tensional strength to keep the bundle secured during laying and beyond burial, but weakens or vanishes after burial. By the decomposition/dissolution rate is meant the speed of the dissolution process.

The material should not dissolve or decompose too quickly to avoid dissolution/decomposition already during laying or during the period the cables are waiting for the burial. The decomposition/dissolution rate of the material is thus adapted to vary from a few days to weeks so that the tensional strength of the securing means is decreased after burial of the cables.

The material of the securing means may be for example based on water-soluble polymers, which can be thermoplastic. Such materials may be provided in different forms, such as fibers, threads or yarns or even as moulded products, e.g. as clamping means. Different kinds of woven and nonwoven securing means may be made of fibers or yarns based on thermoplastic polymers. Woven materials may provide a very strong structure to the securing means. Non-woven materials may be easily decomposable or water-soluble. The securing means may be also in the form of strands, cords, belts or ropes.

Examples of such water-soluble polymers are poly((meth) acrylic acid), polyacrylamide and polyglycolic acid. These materials may have a controlled solubility or chemical decomposition and are thus suitable for the present securing means. Yarns and fibers based on these materials are available on the market today and are used for example as suture materials or as fillers in construction materials, such as concrete.

The material of the securing means may also be an adhesive tape, which is water soluble or biologically or chemically decomposable. Examples of such adhesive tapes are for example tapes based on nonwoven materials comprising cellulosic fibers, poly vinyl alcohol (PVA)-based tapes and cellulose-based film tapes that are bio-degradable. These tapes are available on the market and used for example in packaging industry and there are several producers for such tapes.

The securing means may be applied to the bundle of cables in different formations. For example the securing means may be helically wrapped around the bundle of cables. Wrapping machines, such as commercially available tape wrapping machines, can be used for the purpose, and thus an easy application of the securing means can be provided.

The securing means may also be braided or interweaved with the cables to form a structure in which the cables are fastened or secured together. Braiding wheels are available to provide a braided structure. When the securing means is interwoven with the cables, it may be done such that there is a gap between adjacent cables which corresponds to the thickness of the securing means. By this arrangement, the cables can also be protected against damages caused by mutual forces between the underwater cables.

Figure 5:
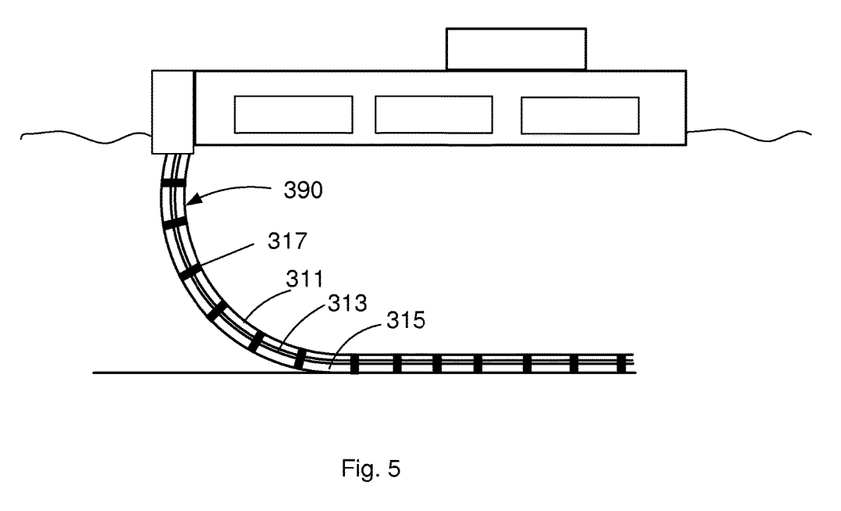
FIG. 5 shows a bundle of cables secured with intermittently placed belts or straps, wrapped around the bundle of cables.

The securing means may also be a clamping means which is water-soluble or biologically or chemically decomposable. According to one embodiment, the clamping means is adapted to secure the cables together and has a shape that can contain and fasten or secure the cables together in the bundle. The clamping means is positioned intermittently, i.e. non-continuously at regular or irregular intervals along the length of the bundle in a similar manner as illustrated in FIG. 5, and fastened around the cables along the length of the cables.

According to another embodiment, the securing means is clamping means which is adapted to secure or fasten a wrapping means around the cables. In this case the wrapping means is wrapped around the bundle of cables intermittently along the length of the bundle and around the cables, in a similar manner as illustrated in FIG. 5. The clamping means is adapted to fasten ends of the wrapping means so as to form tight securing of cables. The wrapping means may be in the form of a strand, cord, belt, wire or rope or corresponding means. The wrapping means may be water-soluble, biologically or chemically decomposable. The wrapping means may also be a traditional non-soluble or non-decomposable material, such as a woven belt of polyester or corresponding material. In this case, the clamping means alone dissolves or biologically or chemically decomposes and thus releases the securing of the cables. The clamping means may be of any shape or kind as long as it fastens the ends of the strand, cord, belt, wire or rope or corresponding means and keeps the wrapping means tightly wrapped around the bundle of cables. In this case, the clamping means may also be provided in the form of a seam, for example by means of sewing.

After decomposition or dissolution, the cables can be gripped individually by a remotely operated underwater vehicle (ROV) and the faulty cable can be isolated from the other cables. Thus, the faulty cable can be cut and taken to the surface for repair without the need to cut the entire bundle. This is a huge advantage and leads to considerable decrease in the work-load and to an easier repairing while the advantages obtained by the securing during laying of the cables can be maintained.

The present invention also relates to a method of laying at least two underwater cables simultaneously from a vessel comprising the steps of providing at least two underwater cables in storage facilities, drawing or unwinding the underwater cables from the storage facilities and bringing the underwater cables together and fastening the underwater cables together by means of a securing means, which is water-soluble, biologically and/or chemically decomposable to form a bundle of cables as defined above. The bundle of cables is then guided overboard and laid on a desired position on the sea bed. The cable storage reels or facilities can be driven to unwind the cables or the cables may be drawn from the storage reels by suitable means. The cables are preferably tensioned before fastening the cables together so that damages to the cables can be avoided and so that an even bundle can be provided.

The fastening or securing of the cables may be done by using any available technology that is suitable for wrapping, such as commercial tape wrapping machines. The method preferably comprises helically wrapping the bundle of cables by means of the securing means and the wrapping may be done along the length of the bundle. Thus, an easy wrapping with relatively strong fastening may be provided. The wrapping may also be performed such that at least two securing means are wrapped around the bundle of cables helically in opposite directions to provide a counter-helical structure for the securing means. By providing the counter-helical structure, the forces provided by the securing means can be even along the length of the cables and thus, a greater torsional rigidity for the bundle can be provided. Also, damages to the cables can be avoided while a facilitated handling of the cables can be provided.

The method may further comprise a step of burying the bundle of cables into the sea bed. By this way it can be assured that the bundle is kept together also after the securing means has lost its tensional strength.

The present invention further relates to a use of a water-soluble, biologically decomposable and/or chemically decomposable securing means to fasten at least two underwater cables together to form a bundle of underwater cables.

Now turning back to the drawings, examples of further possible solutions are presented. In FIGS. 3-6 a similar vessel as in FIG. 1 is shown. The vessel 1 floats on water 3, above the sea bed 7, and comprises a laying arrangement 5 which comprises means for feeding, supporting and guiding (not shown), and storage reels 21, 23 and 25 mounted on the vessel. The cables 111, 113 and 115 may be individually unwound from the storage facilities 21, 23, 25, fed and brought together at the laying arrangement 5 which also comprises means for applying securing means 117 and 117' to form a bundle 90 of cables. The laying arrangement 5 further comprises, downstream the means for applying the securing means, means for guiding the bundle of cables overboard into the water. The guiding means may be for example simply a U-shaped channel. The bundle of cables 90 is then laid on the sea bed 7 and buried into the sea bed at once or after a while.

Figure 3:
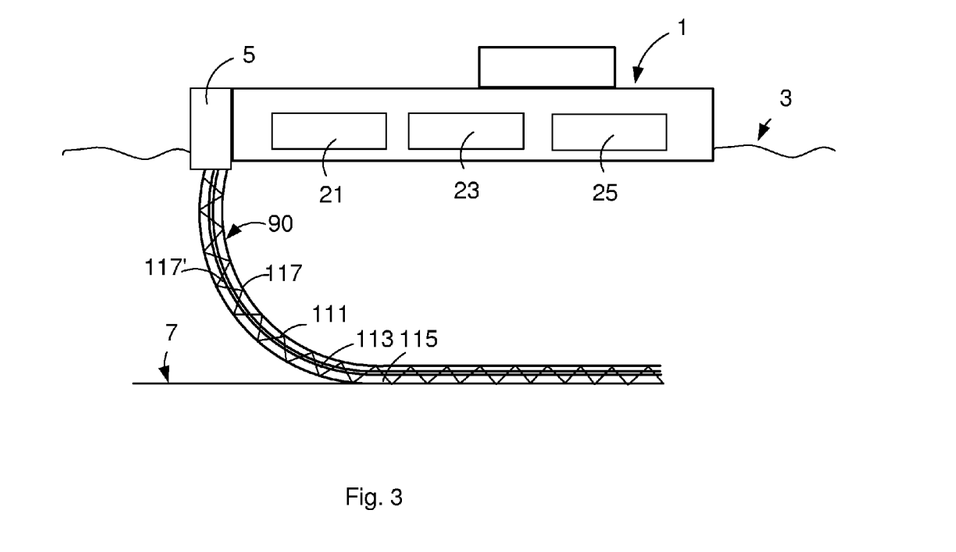
FIG. 3 shows a bundle of cables secured with helically wound continuous counter-helical strands.

As shown in FIG. 3, a bundle 90 of cables 111, 113, 115 is laid from the vessel 1 to the sea bed 7. In this figure it has been illustrated that the cables 111, 113 and 115 are fastened or secured by means of a helically wrapped water-soluble, biologically decomposable and/or chemically decomposable securing means 117, 117' which can be a strand, cord, belt, wire or rope or corresponding means. The helical wrapping can be provided by means of two wrapping means that wrap the securing means 117 and 117', respectively, around the bundle of cables 90 in opposite directions. The wrapping means may be for example a braiding wheel or a commercially available tape wrapping machine. Thus, a counter-helical structure for the securing means can be provided. By this wrapping, the forces provided by the securing means are even in both helical directions along the length of the bundle and thus, a facilitated handling of the cables can be provided while damages to the cables can be reduced.

Figure 4:
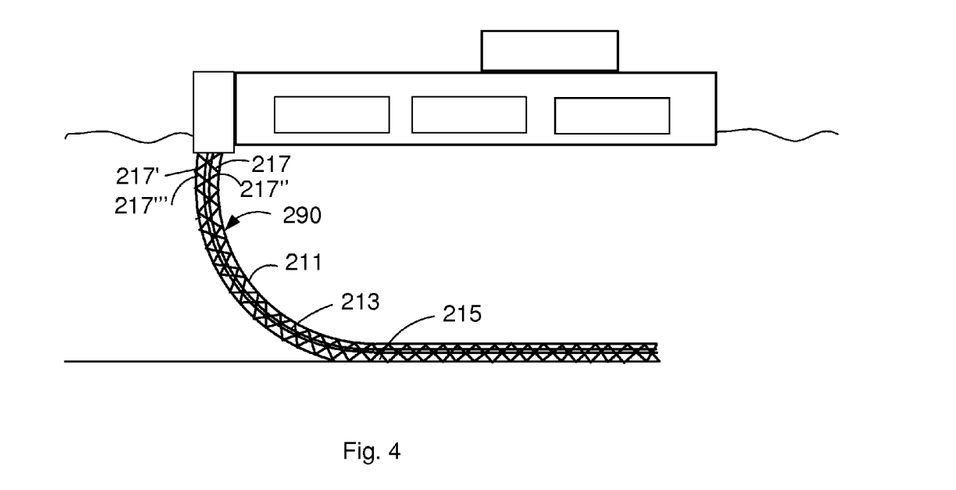
FIG. 4 shows a bundle of cables secured with helically wound, continuous braided strands.

In FIG. 4 several, such as 3-4, strands, cords, belts, wires or ropes or corresponding water-soluble, biologically decomposable and/or chemically decomposable securing means 217, 217', 217" and 217''' are braided around the cables 211, 213, 215 to form a bundle 290 of cables. In this embodiment the braided structure is used to further strengthen the securement of the cables.

In FIG. 5 it is schematically shown that a strand, cord, belt, wire, rope, or corresponding water-soluble, biologically decomposable and/or chemically decomposable securing means 317 is intermittently wrapped around the cables 311, 313 and 315 to form a bundle 390 of cables. The securing means 317 could also be a water-soluble, biologically decomposable and/or chemically decomposable clamping means that surrounds the bundle of cables and thus secures the cables 311, 313 and 315 together.

Figure 6:
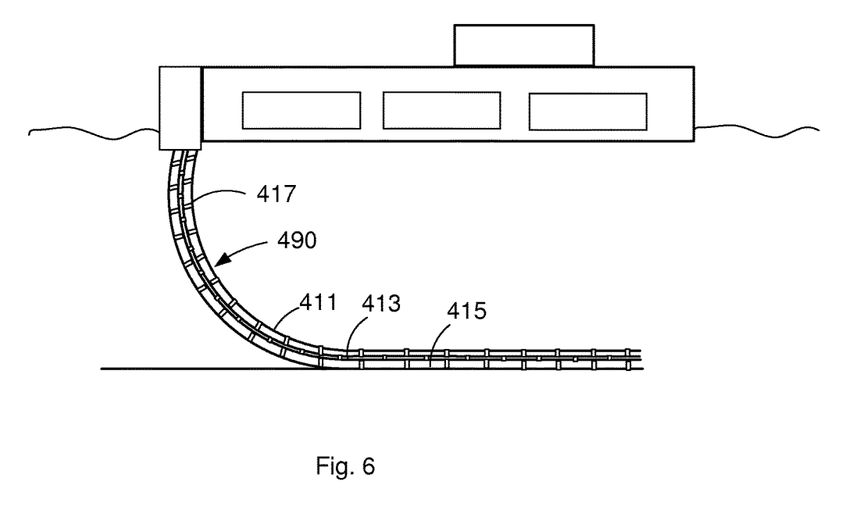
FIG. 6 shows a bundle of cables secured with a cord interweaved with the cables.

In FIG. 6 a strand, cord, belt, wire or rope or corresponding water-soluble, biologically decomposable and/or chemically decomposable securing means 417 has been braided or interweaved with the cables 411, 413, 415 to form a structure in which the cables 411, 413 and 415 are secured together such that a gap is formed between the adjacent cables 411, 413 and 415 which corresponds to the thickness of the strand, cord, belt, wire or rope or corresponding securing means 417, and a bundle 490 of cables is thus formed. By interweaving the securing means in this way, damages caused by the mutual forces between the cables can be reduced. The securing means 417 dissolves in water after a predetermined time and thus releases cables.

Figure 7:
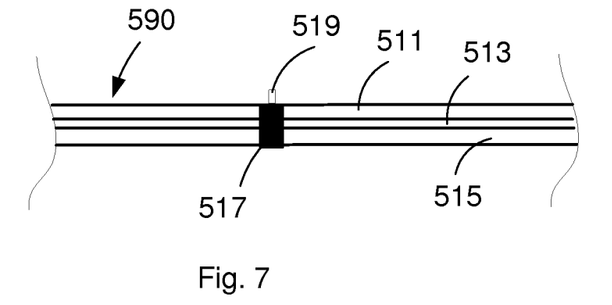
FIG. 7 shows a bundle of cables secured with a belt comprising a water-soluble or chemically/biologically decomposable clamping means.
Figure 8:
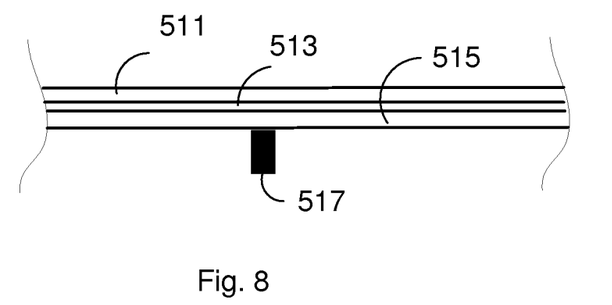
FIG. 8 shows the bundle of cables after the clamping means in FIG. 7 has dissolved or chemically/biologically decomposed.

In FIGS. 7 and 8 a function of a water-soluble, biologically decomposable and/or chemically decomposable securing means which is in the form of a clamping means 519 is illustrated. A wrapping means 517 is intermittently fastened around the cables 511, 513 and 517. The clamping means 519 is adapted to secure the ends of a wrapping means 517, which is a belt, together. After applying the clamping means 519 on board of a vessel, the clamping means secures the belt 517 around cables 511, 513 and 515. After a certain time, e.g. after burial in the sea bed, the clamping means 519 dissolves or decomposes and releases the belt 517 and thus the cables 511, 513 and 515, as shown in FIG. 8.

Figure 9:
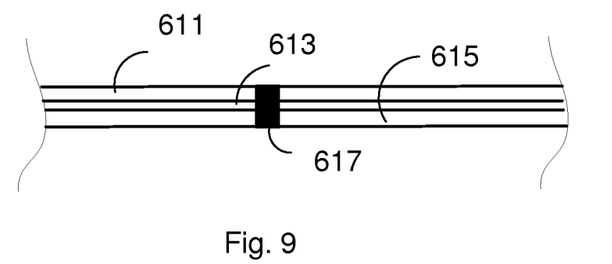
FIG. 9 shows a bundle of cables secured with a water-soluble or chemically/biologically decomposable clamping means in accordance with another embodiment.
Figure 10:
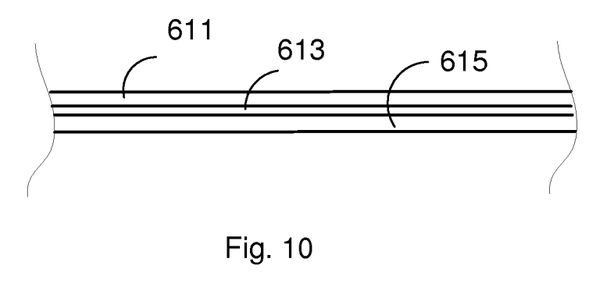
FIG. 10 shows the bundle of cables after the clamping means in FIG. 9 has dissolved or chemically/biologically decomposed.

In FIGS. 9 and 10 a function of a securing means which is a water-soluble, biologically decomposable and/or chemically decomposable clamping means 617 is illustrated. In FIG. 9 it is illustrated that the clamping means is fastened around the cables 611, 613 and 615. The clamping means may be intermittently fastened along the length of the cables as shown in FIG. 5. After applying the clamping means 617 on board of a vessel, the clamping means secures the cables 611, 613 and 615 together. After a certain time, e.g. after burial in the sea bed, the clamping means 617 dissolves or decomposes and releases the cables 611, 613 and 615, as shown in FIG. 10.

While the invention has been described in connection with examples in the drawings, it is not intended to limit the scope of the invention to the particular form set forth, but on the contrary, it is intended to cover such alternatives, modifications, and equivalents as may be included within the scope of the invention as defined by the appended claims.

The invention claimed is:

1. A bundle of cables, comprising:
    at least two underwater cables;
    an underwater power cable; and
    a fastener for fastening the underwater cables together,
    wherein the fastener is water-soluble, biologically decomposable by bacterial or fungal action and/or chemically decomposable by hydrolysis and is configured to release fastening of the underwater cables from the bundle after the fastener is dissolved by water, biologically decomposed by bacterial or fungal action and/or chemically decomposed by hydrolysis, and
    wherein the fastener is wrapped around the bundle of cables, or is braided or interweaved with the cables to form a structure in which the cables are fastened together such that there is a gap between adjacent cables which corresponds to a thickness of the fastener.

2. The bundle of cables according to claim 1, wherein the bundle comprises an underwater fiber optical cable.

3. The bundle of cables according to claim 2, wherein the fastener is an adhesive tape.

4. The bundle of cables according to claim 2, wherein the fastener is a strand, cord, belt or rope.

5. The bundle of cables according to claim 2, wherein the fastener is woven.

6. The bundle of cables according to claim 1, wherein the fastener is an adhesive tape.

7. The bundle of cables according to claim 1, wherein the fastener is a strand, cord, belt or rope.

8. The bundle of cables according to claim 1, wherein the fastener is woven.

9. The bundle of cables according to claim 1, wherein the fastener is non-woven.

10. The bundle of cables according to claim 1, wherein the fastener is a clamp.

11. The bundle of cables according to claim 1, wherein the fastener comprises a thermoplastic polymer.

12. The bundle of cables according to claim 11, wherein the fastener comprises polyglycolic acid.

13. The bundle of cables according to claim 1, wherein the fastener has a predetermined rate of dissolution, chemical decomposition or biological decomposition.

14. A method of laying at least two underwater cables comprising an underwater power cable simultaneously from a vessel comprising the steps of:
    providing the at least two underwater cables in storage facilities;
    drawing or unwinding the underwater cables from the storage facilities and bringing the underwater cables together;
    fastening the underwater cables together to form a bundle of cables by a fastener which is water-soluble, biologically decomposable by bacterial or fungal action and/or chemically decomposable by hydrolysis and is configured to release fastening of the underwater cables from the bundle after the fastener is dissolved by water, biologically decomposed by bacterial or fungal action and/or chemically decomposed by hydrolysis, wherein the fastener is wrapped around the bundle of cables, or is braided or interweaved with the cables to form a structure in which the cables are fastened together such that there is a gap between adjacent cables which corresponds to a thickness of the fastener;
    guiding the bundle of cables overboard into water; and
    laying the bundle of cables on a desired position on a sea bed.

15. The method according to claim 14, wherein the step of fastening further comprises the step of helically wrapping the bundle of cables by means of the fastener along a length of the bundle of cables.

16. The method according to claim 15, wherein the wrapping is performed such that at least two fasteners are wrapped around the bundle of cables helically in opposite directions to provide a counter-helical structure for the fastener.

17. The method according to claim 14, further comprising the step of burying the bundle of cables into the sea bed.

18. A method comprising the step of using of a water-soluble, biologically decomposable by bacterial or fungal action and/or chemically decomposable by hydrolysis fastener to fasten at least two underwater cables comprising an underwater power cable together to form a bundle of cables and to release fastening of the underwater cables from the bundle after the fastener is dissolved by water, biologically decomposed by bacterial or fungal action and/or chemically decomposed by hydrolysis,
    wherein the fastener is wrapped around the bundle of cables, or is braided or interweaved with the cables to form a structure in which the cables are fastened together such that there is a gap between adjacent cables which corresponds to a thickness of the fastener.

* * * * *